E. FAVARY.
RESILIENT TIRE.
APPLICATION FILED MAR. 18, 1916.
1,363,856.
Patented Dec. 28, 1920.
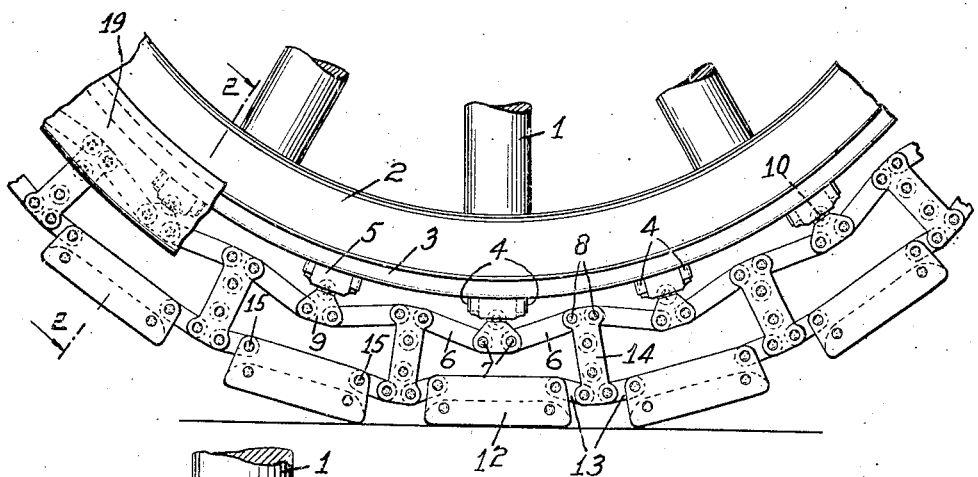
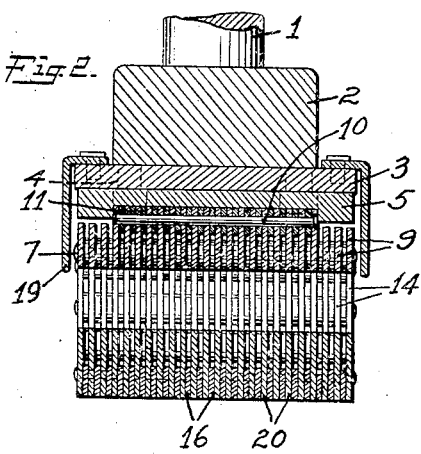
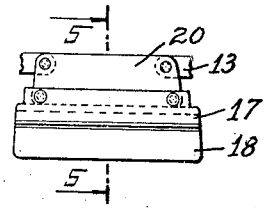
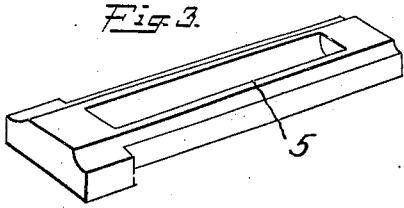
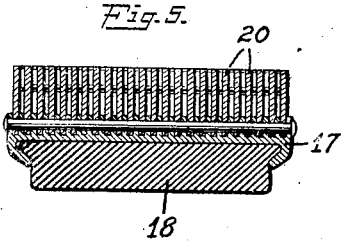
Inventor
Ethelbert Favary
By his Attorneys

UNITED STATES PATENT OFFICE.

ETHELBERT FAVARY, OF NEW YORK, N. Y.

RESILIENT TIRE.

1,363,856.

Specification of Letters Patent. Patented Dec. 28, 1920.

Application filed March 18, 1916. Serial No. 85,018.

*To all whom it may concern:*

Be it known that I, ETHELBERT FAVARY, residing at and whose post-office address is 2880 Broadway, city, county, and State of New York, have invented certain new and useful Improvements in Resilient Tires; and I do hereby declare the following to be a full, clear, and exact description of the invention, such as will enable others skilled in the art to which it appertains to make and use the same.

Tires for heavy vehicles such as trucks should, among other things, be strong and resilient so as to reliably support and protect the vehicle when subjected to vibration and shock in passing over uneven ground, and should also have a capacity for considerable deformation so as not to unduly raise or jolt the vehicle in passing over obstructions. Furthermore, such tires should continually present a large surface to the road, so that the pressure and shock may be distributed over a considerable part of the tread surface of the tire and be more readily absorbed in the tire structure, and also so as to adapt the tire for use on unpaved ground or soft roads. Pneumatic tires possess sufficient resiliency and are capable of sufficient deformation, but they are generally too weak and present insufficient tread surface to the road, unless they are made unduly wide and have an impractical wall thickness, whereas when strength is procured by a continuous periphery of solid rubber or metal, the tire is deficient in resiliency and deformation. In order to increase the deformability of such tires on trucks designed to operate at comparatively low speed, one or more rows of blocks of rubber, or rigid material supported on elastic cushions, have been used, but although a considerable surface is generally presented to the ground, and the capacity for deformation is slightly increased over the continuous solid construction, such tires do not possess sufficient resiliency even at low speed and are subjected to excessive localied stress and destruction at the edges of the blocks as they reach the road and pass out of contact therewith.

In accordance with the present invention, the requisite resiliency is obtained by providing a supporting structure resiliently responsive to deformation, and preferably made up of circumferentially-extending longitudinally-tensioned pliable bands spaced apart in a radial direction by spacing and transmitting members, and requisite strength is preferably secured by forming a plurality of interconnected chains of metal links into a laminated flexible band and connecting the chains of adjacent bands by links forming the spacing and transmitting members therefor. This structure can be made of any suitable width and thereby of any strength without sacrificing resiliency or capacity for deformation. Having such a supporting structure, a plurality of tread members may be connected to the outer band and preferably form a part thereof, so as to be individually movable inwardly when subjected to load. In the chain construction, the tread members are connected to the spacing and transmitting links by means of links adapted to provide sufficient inward movement to permit each tread member to assume a flat position on the ground almost immediately that it comes into contact with the ground and to remain in contact with the ground until the following tread member presents its entire surface to the ground. In this way, the tire continually presents a considerable surface to the ground and prevents excessive localized stress and destruction at the edges of the tread members, notwithstanding the fact that the characteristic resiliency and deformability of the tire are retained. Furthermore, the stresses are distributed throughout a substantial part of the supporting structure, especially in the preferred form of chain construction, where-in the adjacent transmitting members to which the tread members are connected are considerably separated around the periphery of the tire.

The accompanying drawings illustrate the preferred form of construction wherein the supporting structure is made up of chain links and the tread members form a part of the outer band. In the drawings, Figure 1 is a side elevation, partly broken away, of a portion of the tire, illustrating the position of the parts when the tire is supporting a load; Fig. 2 is a section on line 2—2 of Fig. 1; Fig. 3 is a perspective view of a cradle for supporting the tire on the rim of the wheel; Fig. 4 is a side view of a modified form of a tread member carrying a solid block of suitable material; and Fig. 5 is a section on line 5—5 of Fig. 4.

The wheel is represented herein by the spokes 1, the rim or felly 2 and the felly band 3. The anchorages 4 are fastened to the wheel and abut opposite sides of the cradles 5, which are alternately reversed and are forced underneath the tire from opposite sides of the wheel, when the tire is in place on the wheel, to put the bands under longitudinal tension. Shims or wedges (not shown) may be inserted underneath some or all of the cradles to further tension the tire, if desired.

Although more bands may be provided, the tire shown herein has an inner band and an outer band. The inner band is formed by any desired number of chains set side by side and forming in effect a laminated structure of great strength. The sidewise adjacent links 6 of each chain are connected together by the pivot rods or pins 7 or 8. The connecting links 9 are loosely mounted on adjacent pins 7 and besides connecting the endwise adjacent links 6, they have a rounded bottom and carry rods 10 on which are mounted intermediate washers 11 so as to form a socket member presenting a smooth rocking surface to the cradle.

The outer band is made up of the tread members 12 and the intermediate members or links 13 connecting them to the transmitting or spacing members 14 which transmit the stress between the bands and hold them apart in a radial direction. In Figs. 1 and 2, each tread member is made up of a number of sidewise adjacent links 20 mounted on pins 15 which pass loosely through them and through the intermediate links 13. The contact surface of the tread member is made solid in effect by the interposition of fillers 16 mounted on pins. In the modification shown in Figs. 4 and 5, each tread member carries a shoe 17 for retaining a block 18 of solid rubber, metal, or any other suitable material, forming the tread of the tire. The side flanges 19 prevent the entrance of dirt into the tire.

As indicated in Fig. 1, the tread members are individually capable of inward movement when subjected to load, and the load is thereby continually distributed over a surface having a considerable length for the full width of the tire. The entire load resting on the tread member shown in contact with the road is transmitted to the supporting structure of the tire through the intermediate links 13 and from them throughout a considerable portion of the inner and outer bands on both sides of that tread member, thereby distributing the stress throughout the structure and bringing the resiliency thereof into action. It should be noted that the inner band is in zig-zag formation and therefore, in itself would be untensioned if no load or force acted radially inward through the spacing members 14, but the outer band is under comparatively great tension, always, thus exerting a continued inward radial pressure on the inner band through the spacing members 14, and this effect is analogous to a load always resting on the outer band. The inner band is therefore always under great tension. When an external load is applied, as shown in Fig. 1, the outer band is pressed inward, at its point of contact with the ground, and the immediately adjacent members 14 will move toward the felly and will cause additional tension in the inner band. The whole structure is therefore always resiliently responsive. The greater the load on the tread members, the greater the tension in the bands and the greater the inward movement of members 14, while as the load is decreased the tension in the bands is reduced. However, there always is considerable tension in the bands and this causes the tire to be resilient. The movement of the tread members, together with the movement of the supporting structure, permits a considerable amount of deformation when an obstruction is encountered, thus preventing undue jolting of the vehicle.

As the vehicle moves on, the following tread member is laid flat on the ground before the entire load rests on it, and it supports the entire load before the tread member which was previously in contact with the ground is lifted from the ground. As a result of this action, the tire continually presents a considerable surface to the road, and normally the entire load is never carried on the tips of the tread members.

In order to decrease the friction between the links of the tire and to eliminate noise, the tire may be immersed in graphite, or other suitable lubricant. The links are made of steel or other suitable material, and the rods or pins are preferably made of steel and hardened to reduce wear. The cradles 5 are made of bronze or aluminum.

Having thus described my invention, what I claim is:

1. The combination with a vehicle wheel of a resilient tire therefor, comprising a plurality of circumferentially extending pliable bands longitudinally tensioned on the rim of the wheel and placed apart radially by spacing members attached thereto, the outer band comprising the outer portion of the spacing members, a plurality of tread members and a plurality of links which also constitute a part of the outer band pivotally when subjected to load.

2. The combination with a vehicle wheel of a resilient tire therefor, comprising a circumferentially extending pliable band longitudinally tensioned on the rim of the wheel, an outer band containing a plurality of tread members, all tread members pivotally connected to intermediate members which also constitute a part of the outer band and means for holding the two bands apart in a radial direction and pivotally connected to each tread member and each tread member being individually movable inward independent of the other tread members when subjected to load.

3. The combination with a vehicle wheel, of a resilient tire therefor, comprising a circumferentially extending pliable band longitudinally tensioned on the rim of the wheel, a plurality of spacing members attached to the band, a plurality of tread members, all tread members intermediate of the spacing members and connected thereto by pivoted links so that each tread member will be individually movable inward independent of the other tread members when subjected to load.

4. The combination with a vehicle wheel, of a resilient tire therefor, comprising a plurality of circumferentially extending interconnected bands composed of laminations pivotally connected together and longitudinally tensioned so as to be resiliently responsive to deformation, the outer band comprising a plurality of tread members and a plurality of links pivotally mounting each tread member so that it will be capable of limited individual inward movement independent of the other tread members when subjected to load.

5. The combination with a vehicle wheel, of a resilient tire therefor, comprising a plurality of circumferentially extending pliable bands longitudinally tensioned on the rim of the wheel and placed apart radially by spacing members, the outer band comprising a plurality of tread members pivotally mounted at some distance from the spacing members whereby each tread member is individually movable inward independent of the other tread members when subjected to load.

6. The combination with a vehicle wheel of a resilient tire therefor, comprising a plurality of circumferentially extending pliable bands longitudinally tensioned on the rim of the wheel and placed apart radially by spacing members, the outer band comprising a plurality of non-pliable tread members pivotally mounted at some distance from the spacing members whereby each tread member is individually movable inward independent of the other tread members and movable inward to a greater degree than the spacing members when subjected to load.

7. The combination with the vehicle wheel of a resilient tire therefor, comprising a longitudinally tensioned supporting structure of substantially inextensible material resiliently responsive to deformation, a plurality of tread members, and a plurality of links pivotally mounting each tread member so that it will be capable of limited inward movement independent of the other tread members, and so that it will be movable inward to a greater degree than any other portion of the structure, when subjected to load.

In testimony whereof I affix my signature.

ETHELBERT FAVARY.